Patented Feb. 1, 1927.

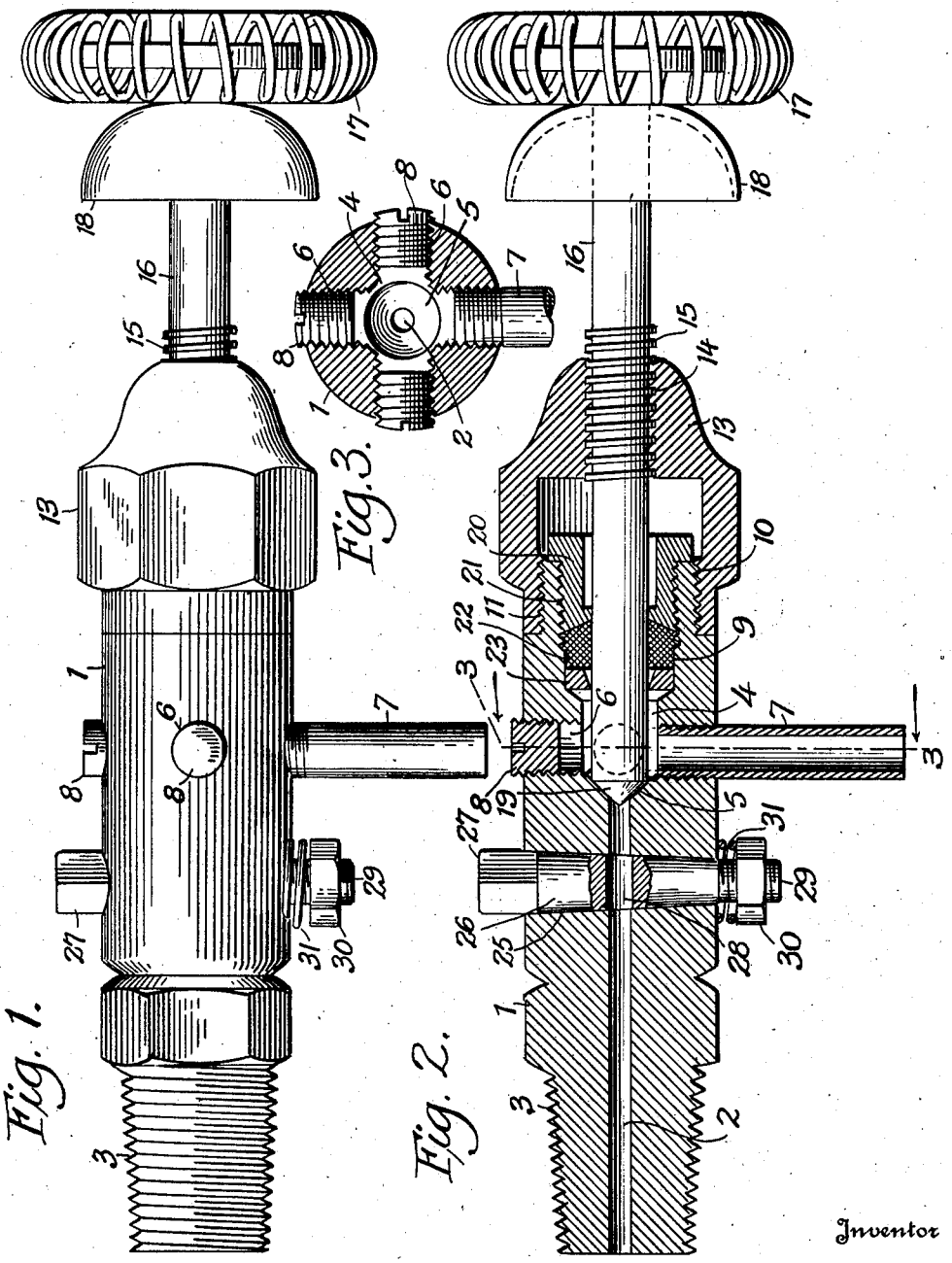

1,616,287

UNITED STATES PATENT OFFICE.

LESTER V. STONE, OF AUGUSTA, GEORGIA, ASSIGNOR OF ONE-FOURTH TO J. R. GOOD AND ONE-FOURTH TO M. C. B. HOLLEY, BOTH OF AUGUSTA, GEORGIA.

GAUGE COCK.

Application filed October 27, 1924. Serial No. 746,179.

My invention relates to improvements in gauge cocks, particularly adapted for use in connection with horizontal steam or water boilers, although the device may be used in any situation where it would perform its function in a practical and efficient manner.

The main object of my invention is the provision of a gauge cock which will be composed of the fewest possible number of parts to insure a structure which will be extremely simple, durable and inexpensive of construction and from every point of view thoroughly efficient and practical.

To attain the desired objects my invention consists of a gauge cock embodying novel features of construction and combination of parts for service, substantially as described and distinguished by the claims, and as shown in the accompanying drawing, wherein:—

Figure 1 represents a side elevation of a cut off gauge cock constructed in accordance with and embodying my invention.

Fig. 2 represents a vertical central longitudinal sectional view of the gauge cock, and Fig. 3 represents a sectional view taken on the line 3—3 of Figure 2.

In carrying my invention into effect and according to my improvements, the gauge cock consists preferably of the tubular body portion 1, which is provided with the channel or passage 2 extending throughout its length and with the boiler engaging threaded portion 3, by which the cock is connected to the boiler, while the body is further provided with the chamber 4, the conical valve seat 5, the series of radially arranged threaded openings 6, adapted one to receive the drip nipple 7, and others to receive the threaded plugs 8.

From this construction it will be noted that the gauge cock screws into the boiler at the proper place to determine the level of steam or water and is provided with the passage or channel and the valve chamber having the seat and further with the drip nipple and the series of closing plugs, the outer portion of the body being provided with an enlarged chamber 9 and with an extended exteriorly threaded portion 10 which receives the extended interiorly threaded portion 11 of the cap 12, the exterior diameter of the body and cap at their joint being preferably precisely the same to provide when assembled a smooth exterior at the joint. Also, the interior of the cap is spaced from the cap or gland 20 to prevent abrasion between the two surfaces. The cap 12 is provided in its crown 13, with threads 14, to receive the threaded portion 15, of the valve stem 16, which is provided at its outer end with a manipulating handle or grasping portion 17, the adjacent protecting cup or guard 18, and at its lower end with the tapered portion 19 seating in valve seat 5, while said stem passes through the threaded cap or gland 20 which engages interior threads 21, on the body portion and passes through the washer or gasket 22, and the ring 23, which seats upon the shoulder 24, in the enlarged chamber portion of the body of the cock.

The body portion intermediate its threaded end and valve seat is provided with a tapered opening 25, in which fits the wedge shaped plug 26, having one end provided with a squared or angular portion 27, to receive a wrench for turning said plug to either open or close its passage 28, with reference to the passage of the body of the cock, while its other end 29 preferably extends beyond the body and is threaded to receive the nut 30, between which and the body portion is placed the coil spring 31, which acts to keep the tapered plug always in tight fitting relation to the body portion. The plug may be loosened if desired by a blow on the extension 29.

From the foregoing description taken in connection with the drawing the functions and operations of my gauge cock will be instantly understood and it will be noted that the body portion may be screwed into the boiler and the nipple by reason of the series of openings be invariably disposed in the proper vertical position; also that the key or plug may be turned to shut off the steam or water and permit the parts to be removed for purpose of cleaning or repair; and that generally a gauge cock constructed according to my invention will prove desirable, practical and efficient in every particular.

It will be observed that my gauge cock consists of the body portion and cap, which are detachably connected, and that said body portion is formed with a longitudinal channel, a valve chamber, and a packing chamber of larger size than the valve chamber, and that mounted in said packing chamber are a metal ring, a washer protected by the ring, and a threaded cap or gland retaining the washer and ring in place, and having a wrench-receiving portion, this packing chamber constituting a most important feature of my invention, in that it permits instant application and adjustment, and also removal of parts for purpose of repair, cleaning or replacement.

I claim:

1. The gauge cock herein described, comprising an integral body portion having a longitudinal channel, a chamber having a valve seat and outlet, and an enlarged packing chamber opening into the first-named chamber, a cap connected to the body portion, a valve stem rotatably mounted in said cap with its inner end shaped to fit the valve seat, a ring, washer and threaded gland fitting upon the valve stem and disposed in said packing chamber, said gland having a wrench-receiving portion to permit its application, adjustment and removal and being out of contact with the cap, and a plug in the body portion for controlling said longitudinal channel.

2. The gauge cock herein described, consisting of a body portion having an inner threaded end, a narrow longitudinal passage, an enlarged chamber provided with a valve seat, an outlet leading from said chamber, a further enlarged chamber having a smooth portion forming a seat and having an internally threaded portion and an externally threaded shoulder portion, a cap having a threaded valve stem passage and an internally threaded flange to engage the threaded shoulder of the body portion to make a smooth exterior joint, a valve stem having an intermediate threaded portion to engage the threads of the cap, and an inner end to seat in the said valve seat, a ring and washer around the valve stem and arranged in said further enlarged channel of the body portion, a threaded gland fitting on the valve stem having its inner end in engagement with the washer with its threaded portion in engagement with the interior threads of the body portion and further provided with a wrench-receiving portion, and a plug mounted in the body for controlling the narrow longitudinal passage thereof, and having its ends extending outside the body.

In testimony whereof I hereunto affix my signature.

LESTER V. STONE.